United States Patent Office 3,481,722
Patented Dec. 2, 1969

3,481,722
PROCESS FOR PRODUCING HYDROGEN
William C. Pfefferle, Middletown, N.J., assignor to Engelhard Industries, Inc., Newark, N.J., a corporation of Delaware
No Drawing. Filed May 15, 1964, Ser. No. 367,886
Int. Cl. C10g *13/10*
U.S. Cl. 48—214        3 Claims

ABSTRACT OF THE DISCLOSURE

A two-stage process for steam reforming of normally liquid hydrocarbons by contacting an admixture of the hydrocarbon feed with steam and added hydrogen in a first stage with a platinum group metal catalyst at a temperature below 700°C., and contacting the first stage effluent with additional catalyst in a second stage at a temperature between 700° C. and 1000° C.

---

This invention relates to an improvement in the method for the production of hydrogen from gaseous mixtures of steam and hydrocarbons with the aid of a catalyst. More particularly, the invention concerns an improved method for steam reforming of hydrocarbons whereby admixtures of hydrogen, carbon monoxide and carbon dioxide are produced by the reaction of steam with a hydrocarbon.

Because of the rapidly increasing demand for hydrogen, the development of improved processes for steam reforming of hydrocarbons is of great economic importance. Heretofore, steam reforming of hydrocarbons has been effected on a commercial scale by contacting admixtures of steam and hydrocarbons with catalysts of the iron group, notably supported nickel catalysts, at temperatures and pressures selected to convert the feed to a desired gas composition. In such reactions, normally gaseous and/or normally liquid hydrocarbons have been employed as feed, and a wide variety of nickel-containing catalysts have been developed commercially to provide optimum performance with any particular feed at particular reaction conditions.

More recently, attention has been given to processes for steam reforming of normally liquid hydrocarbons by contacting the feed in admixture with steam with a catalyst selected from the group consisting of platinum metals, viz., Pt, Pd, Rh, Ir, Os and Ru. Such catalysts, which have heretofore been suggested for such purpose, but never used to my knowledge in commercial practice, are particularly effective for the conversion of liquid hydrocarbons derived from petroleum to produce gaseous mixtures of hydrogen, carbon monoxide and carbon dioxide.

The present invention provides an improvement in the process for steam reforming normally liquid hydrocarbons by reacting such hydrocarbons with steam in the presence of a platinum group metal catalyst, which improvement comprises effecting such reaction at an initial reaction temperature below about 700° C. and maintaining the reaction temperature below this value until at least 90% or substantially all of the liquid hydrocarbons in the feed have been converted to methane, hydrogen and oxides of carbon. Thereafter, the reaction temperature can be increased to up to 1000° C. to accelerate the conversion to hydrogen-containing product gas. A further feature of the invention comprises effecting such reaction in the presence of an added amount of hydrogen, the mount of hydrogen being between about 0.05 and 10, preferably 0.1 to 2.0 mols hydrogen per atom of carbon in the feed. A particularly advantageous feature of the invention is that lower steam/carbon ratios can be used than would otherwise be required for steam reforming, particularly where normally liquid hydrocarbons having an average molecular weight of $C_7$ or greater are employed as feed stocks, without coke formation and resultant deactivation of the catalyst.

In the steam reforming of normally liquid hydrocarbons, it has been observed that unless the initial reaction zone is operated at low temperatures to achieve substantial conversion of liquid hydrocarbon to methane, coke is deposited on the catalyst and the catalyst is rapidly deactivated. Normally, steam reforming of hydrocarbons is effected over conventional catalysts with an amount of steam corresponding to from 3 to about 10 mols $H_2O$ per carbon atom in the feed, the conversion of higher molecular weight hydrocarbons ($C_7^+$) requiring more than 5, and usually about 8 to about 10 mols $H_2O$ per carbon atom. Where the temperature in the initial reaction zone is controlled, as aforesaid, and a platinum group metal catalyst is employed, higher molecular weight hydrocarbons such as hydrocarbons in the naphtha boiling range can be reformed at steam/C molar ratios from about 1 to about 5.

With higher steam to carbon ratios, e.g. from about 3 to about 5, temperatures below 700° C. should be used in the initial reaction zone, the inlet temperatures to this initial zone should be below 650° C., preferably below 600° C., the initial reaction zone being that amount of catalyst necessary to achieve at least 90% conversion of the hydrocarbon feedstocks to methane, hydrogen and oxides of carbon. With steam to carbon ratios from about 2 to about 3, respective temperature limits should be 50° C. lower.

A further feature of the present invention comprises effecting the steam reforming reaction in the presence of an added amount of hydrogen.

In the prior art, hydrogen has been present in admixtures with normally gaseous hydrocarbons employed as feed for steam reforming reactions, and sulfur-polluted liquid hydrocarbon has been reformed over a nickel catalyst in the presence of added hydrogen to prevent sulfur poisoning of the catalyst. The present invention is distinct from such prior teachings, in that it is directed to the particular combination of reforming a normally liquid hydrocarbon feed in the presence of hydrogen over a platinum group metal catalyst.

The utilization of hydrogen, coupled with careful control of the temperature in the initial reaction zone, permits successful operation of the steam reforming reaction over platinum metal catalysts at steam/C molar ratios as low as 1 to 2. With hydrogen addition and such low steam to carbon ratios, the maximum temperature in the initial reaction zone should be less than 650° C., preferably about 625° C., and inlet temperatures to this zone should be less than 600° C., preferably below 550° C.

In the practice of steam reforming over conventional commercial catalysts, e.g. supported nickel, it is known that for most effective performance of the catalyst, the feed should be completely or substantially completely free of sulfur-containing impurities. Thus, advantageously the feed to such a process is pre-treated by conventional desulfurization techniques to provide a feed having less than 10 p.p.m., and preferably less than 5 p.p.m. sulfur by weight. One of the advantages of the precious metal catalysts resides in the fact that they are surprisingly more sulfur-resistant than conventional iron-group catalysts, and thus can be employed for reforming of hydrocarbon feeds containing as much as 100 p.p.m. or even more sulfur. Such sulfur containing feedstocks are advantageously used in the process of the present invention, although the improvement in reforming activity of the catalyst does not appear solely related to the effect of hydrogen on the sulfur in the feed.

In the practice of the present invention, normally liquid hydrocarbons are contacted in the presence of steam preferably together with added hydrogen with a precious metal catalyst, advantageously supported on a refractory oxide support. As feedstocks for the process, liquid hydrocarbons from petroleum boiling in the range 30° C. to about 400° C. are employed. For example, liquid hydrocarbons boiling in the gasoline, kerosene and gas oil boiling ranges may be satisfactorily employed. These hydrocarbons may be essentially saturated paraffinic hydrocarbons, or may contain substantial amounts, e.g. up to about 50% of unsaturated or aromatic hydrocarbons. Aromatic hydrocarbons, for example benzene, toluene, xylene and the like, or mixtures thereof such as are normally obtained by extraction of $C_8$ reformate streams, can be used.

The liquid hydrocarbon feedstock may be essentially free of sulfur, e.g. contain less than about 10 p.p.m. sulfur by weight, but higher concentrations, e.g. up to about 50 p.p.m. do not deleteriously affect the platinum metal catalyst. Sulfur-containing feedstocks having up to 500 p.p.m., or even more, can be reformed according to the present process, but such high sulfur feeds can gradually cause deactivation of the catalyst. Unlike conventional catalysts, for example supported nickel catalysts, the platinum metal catalysts can be regenerated, e.g. by steam and/or treatment with hydrogen at elevated temperature.

The reforming reaction is effected by admixing steam and the hydrocarbon feed and passing the vaporized mixture into contact with the catalyst. Normally, steam reforming of hydrocarbons is effected over conventional catalysts with an amount of steam corresponding to 3 to 10 mols $H_2O$ per carbon atom in the feed, the conversion of higher molecular weight hydrocarbons ($C_7^+$) requiring more than 5, and usually 8 to about 10 mols $H_2O$ per carbon atom. A particularly advantageous feature of the present process is the effectiveness of the platinum group metal catalyst, especially in the presence of added hydrogen, to reform higher molecular weight hydrocarbons such as hydrocarbons in the naphtha boiling range at steam/C. ratios of from about 1 to about 5 mols $H_2O$ per carbon atom in the feed.

The reforming reaction is effected by contacting the vaporized reactants with a catalytic composition containing a platinum group metal preferably distributed upon an inorganic oxide support. The platinum group metals are Pt, Pd, Ru, Rh, Os and Ir, and may be used singly or in combination.

The platinum group metal is present in the catalytic composition in proportions of between 0.01 and 20% by weight, preferably from 0.01 to 5% by weight. The platinum group metal can be incorporated with the inorganic oxide support in accordance with methods well known to the art for preparation of such catalysts. For example, the refractory inorganic oxide can be impregnated with the metal or a compound of the metal reducible thereon; for example, by immersing the support in a solution of the metal salt. Alternately, the platinum group metal can be introduced into the catalytic composition during its preparation, for example by mixing the finely divided refractory support with the metal or a compound reducible thereto, followed by forming and calcining the composition, and reducing the platinum metal compound to the metal.

Alumina, particularly transitional activated alumina, are very suitable refractory inorganic oxide supports. Other refractory oxide supports, such as admixtures of alumina and silica containing up to 50% by weight silica, magnesium oxide and zirconia can be used. If a platinum group metal is present in the form of a compound, the compound can be converted to metal by heating in a stream of hydrogen before or during the use of the catalytic composition in steam reforming.

In effecting the reforming reaction, the vaporized mixture of hydrocarbon and steam is contacted with the catalyst at an initial reaction temperature below 700° C., and preferably below 600° C. as set forth hereinbefore, the particular temperature being governed by the molar ratio of steam to carbon employed and the presence or absence of hydrogen in the feed. Subsequent to the inlet point, the temperature is increased, but maintained below 625°–700° C., depending on the $H_2O$ ratio and sulfur level in the feed, and such low temperatures are not exceeded along the catalyst bed until essentially 90% of the hydrocarbons are converted to methane, hydrogen and oxides of carbon. Complete conversion can be effected at this point in the same reactor or in additional reactors wherein the temperature in the catalyst bed is increased and reaches a maximum of 700° to 1000° C. at the outlet of the reactor system. Contacting the feed with the catalyst is effected at a positive pressure, typically from about 2 to 50 atmospheres, and at a weight hourly space velocity (WHSV) within the range of about 0.05 to about 5.

The hydrogen in the feedstock can be introduced in any desirable manner. For example, the feed stock itself may be partially cracked prior to introduction to the steam reformer, as by thermal cracking or by contacting with conventional cracking catalyst, and the partially cracked feed together with hydrogen and, optionally fresh feed, contacted with the platinum metal catalyst. Hydrogen may be introduced by recycling the necessary amount of effluent to obtain the desired amount of hydrogen in the feed, or by separating hydrogen from the effluent for recycle to the reactor.

In Examples 1 and 2, where in the various tests were designed for rapid determination of catalyst activity and stability, the following procedure was employed. Twenty grams of catalyst were placed in a one-inch wide (I.D.) stainless steel reactor tube dispersed with sufficient 8–14 mesh tabular alumina to provide a catalyst zone of about 250 cubic centimeters. The reactor containing each catalyst charge was placed in a bronze-block furnace controlled by thermostats. After purging the air from the system the vaporized feed containing steam and hydrocarbon was preheated to 593° C. and passed through the catalyst. The effluent was passed to a small volume high pressure separator. The water in the effluent was condensed, and the effluent gas metered through a wet test meter and samples thereof analyzed.

In the examples, JP-4 fuel refers to commercially available hydrocarbon fuel (Esso-Turbo Fuel No. 4) having the following properties:

Assumed formula: $C_{8.3}H_{16.8}$
Molecular weight: ca. 111
Aromatics content: ca. 24%
Olefin content: ca. 1.2–2%
95% evaporated at 420° F.
Sulfur: ca. 33 p.p.m.

EXAMPLE 1

Test A

A feed consisting of JP-4 fuel and steam was fed to the test unit described hereinbefore containing a steam reforming catalyst consisting of 0.4 wt. percent Pt and 0.1 wt. percent Rh on alumina spheres containing ca. 6% silica, at a weight hourly space velocity of 1. The ratio of steam:carbon in the feed was 5:1. The pressure in the system was 150 p.s.i.g., and the temperature 600–700° C. The effluent gas was measured and it was determined that 2.3 cubic feet of gas evolved in the first hour, and the effluent gas continuously decreased to 0.9 cubic foot in the fourth hour, showing continuous catalyst deactivation. Oil came through the unit unconverted 15 minutes after start-up.

Test B

A test similar in all respects to Test A was run, except that in the test, hydrogen was added to the feed at the rate of 1 cubic foot/hour, corresponding to approximately 6–7 moles of hydrogen/mol hydrocarbon in the feed or a ratio of $H_2$:carbon in the feed of about .75–.89. The gas effluent was observed over a period of six hours. Approximately 2.4 cubic feet of gas (less $H_2$ added) was evolved in the first hour and in the sixth hour. No unconverted oil was observed in the unit.

Comparison of Tests A and B shows that addition of hydrogen to the feed prevented deactivation of the catalyst. During a portion of Test B, the steam/carbon ratio was reduced to about 4.1/1 without adverse effects. By employing $H_2$ in this manner, steam/carbon ratios as low as 1/1 can be used without adversely affecting the activity or stability of the platinum group metal catalyst.

EXAMPLE 2

Test C

Using the test unit described above, JP-4 fuel was reformed in the presence of steam and added hydrogen over a nickel-containing catalyst. The catalyst was a commercially available composition (G–56, manufactured by Girdler Chemical Co.) containing about 15% nickel. Reforming was effected at a weight hourly space velocity of 0.5. As shown in Table 1, in the 6th through the 10th hour, the gas make declined steadily with a rapid decline in the 8th to 9th hour. In the 10th to 11th hour, ¼″ oil was noted in the separator, and in the 11th to 12th hour, the temperature was increased to 695° C. There was no improvement in the reaction with increase in temperature, i.e., the catalyst was essentially inactivated.

Comparative tests were run using a catalyst comprising 1.6 wt. percent Pt and 0.4 wt. percent Rh on alumina spheres containing about 6% silica and, as feed, a BTX raffinate.[1] Reforming of the feed was effected at a weight hourly space velocity of 1.0 and a pressure of 150 p.s.i.g. The average catalyst bed temperature was about 670° C.

TEST E

This test was run in the absence of added hydrogen, and with an initial mol ratio of steam to carbon of 1.6. After 23 hours, the $H_2O/C$ mol ratio was adjusted to 1.4 and maintained at this value for the remainder of the test. The catalyst showed a steady decline in gas make after the 100th hour, but the operation was still not 88th hour. The temperature was raised to about 700° C. after the 100th hour, but the opetarion was still not satisfactory and the run was shut down at the 119th hour. Examination of the catalyst showed that it was badly coked and fused together. Generally, without added hydrogen, the catalyst ran about 37 hours without deactivation at a steam to carbon ratio of 1.4 to 1, and about 65 hours at such ratio without oil breakthrough.

Test F

In this test, the initial steam to carbon ratio was about 3 mols of steam per mol carbon for the first hour, at

TABLE 1

| | Time, Hrs. | | | | | | | | | | |
|---|---|---|---|---|---|---|---|---|---|---|---|
| | 0-1 | 1-2 | 2-3 | 3-4 | 4-5 | 5-6 | 6-7 | 8-9 | 9-10 a | 11-12 b | 12-13 |
| Temp., °C. mean | 628 | 629 | 629 | 629 | 629 | 629 | 629 | 631 | 632 | 668 | 671 |
| Temp., °C. max | 649 | 649 | 648 | 647 | 646 | 646 | 645 | 647 | 649 | 695 | 69 |
| Pressure, p.s.i.g | 150 | 150 | 150 | 150 | 150 | 150 | 150 | 150 | 150 | 150 | 150 |
| Mols $H_2O/C$ | 4.6 | 4.4 | 5.6 | 5.6 | 5.3 | 5.6 | 5.3 | 4.7 | 4.8 | 5.3 | 5.0 |
| Mols $H_2/C$ | 0.68 | 0.70 | 0.81 | 0.81 | 0.84 | 0.81 | 0.84 | 0.84 | 0.84 | 0.84 | 0.81 |
| Gas Make* | 12.9 | 14.0 | 14.6 | 14.7 | 17.2 | 16.2 | 15.4 | 11.1 | 7.7 | 8.1 | 7.1 | a Steady decline in gas make noted from 6th–11th hours and oil showed in the separator in the 9th–10th hours. In the 10th to 11th hour ¼″ oil was noted in the separator.
b Temperature increased in 10th–11th hour, decline in gas make continued.
*Cubic fee per 100 gm. JP-4 fuel.

Test D

The procedure of Test C was repeated, except that in this test the catalyst consisted of 0.5% rhodium metal on alumina spheres containing 6% silica. The results of this test are given in Table 2. In the 7th and 8th hour, ¼″ oil was noted in the separator but, on increasing the temperature to 707° C., the effluent came through clear, with little change in gas make. The results show that under conditions which resulted in deactivation of the nickel catalyst in 11 hours, the platinum metal catalyst was active for a period of 24 hours.

which point hydrogen recirculation was established and the steam to carbon ratio was reduced to 1.4/1. The hydrogen recirculation was maintained at about 0.09–0.31 mol hydrogen per mol carbon throughout the test. At the end of 140 hours, the unit was operating satisfactorily and showed no sign of catalyst deactivation.

Test G

In this test, using hydrogen addition of about 0.3 to 1 mol hydrogen per mol carbon, after operation with a steam to carbon ratio ranging from 1.8–1.2 mols steam

TABLE 2

| | Time, Hrs. | | | | | | | | | | | | | | |
|---|---|---|---|---|---|---|---|---|---|---|---|---|---|---|---|
| | 0-1 | 1-2 | 2-3 | 3-4 | 4-5 | 5-6 | 9-10 | 10-11 | 11-12 | 18-19 | 19-20 | 20-21 | 21-22 | 22-23 | 23-24 b |
| Temp., °C. mean | 632 | 631 | 629 | 628 | 632 | 629 | 704 | 704 | 704 | 703 | 703 | 703 | 700 | 701 | 703 |
| Temp., °C. max | 649 | 649 | 650 | 649 | 657 | 650 | 707 | 707 | 709 | 710 | 710 | 715 | 713 | 714 | 714 |
| Pressure, p.s.i.g | 150 | 150 | 150 | 150 | 150 | 150 | 150 | 150 | 150 | 150 | 150 | 150 | 150 | 150 | 150 |
| Mols $H_2O/C$ | 5.3 | 5.0 | 4.8 | 5.3 | 5.5 | 5.4 | 4.7 | 4.8 | 5.2 | 4.6 | 4.6 | 5.2 | 4.8 | 4.8 | 5.0 |
| Mols $H_2/C$ | 0.88 | 0.80 | 0.77 | 0.84 | 0.88 | 0.88 | 0.77 | 0.84 | 0.75 | 0.75 | 0.84 | 0.77 | 0.77 | 0.80 |
| Gas Make a | 12.2 | 11.4 | 12.1 | 12.9 | 12.2 | 11.1 | 13.5 | 13.9 | 14.5 | 12.0 | 9.7 | 12.9 | 11.7 | 11.2 | 11.6 | a Cubic feet per 100 gm. JP-4 fuel.
b Run terminated because of break-through of oil.

EXAMPLE 3

The test procedure for this example was similar to that used in Examples 1 and 2. In this example, 50 grams of catalyst were placed in a one-inch wide (I.D.) Inconel reactor tube and dispersed with sufficient 8–14 mesh tabular alumina to provide a catalyst zone of about 200 cubic centimeters. A hydrogen diffusion system was used in the hydrogen recirculation runs to supply pure hydrogen to the feed stream. In operation, after purging the air from the system, the vaporized feed, with or without recirculated hydrogen was passed through the catalyst.

per mol carbon for 125 hours, the catalyst was still operating satisfactorily, and there was no evidence of catalyst deactivation. Examination of the catalyst showed little coke formation, and the catalyst was free flowing and unfused.

---

[1] Typical inspection:
  Molecular weight _____ 92
  Aromatics and olefins _____percent__ 8
  IBP _____ °F__ 150
  EP _____ °F__ 274
  95% evaporated at 251° F.
  Sulfur _____ p.p.m__ 1

EXAMPLE 4

In this example, a BTX raffinate was steam reformed to produce $H_2$. The reaction zone was effected in 3 reactors in series, the initial reaction zone as herein defined comprising the initial portion of the first reactor. Steam to carbon ratios of about 1.4–1.7 mols of steam per mol of carbon were used, and approximately .04 to .54 mol of $H_2$ per mole of C was recycled to the feed through a diffusion unit system. The overall weight hourly space velocity (WHSV) was approximately 0.3. The individual reactor space velocities varied depending on the reactor, i.e., the WHSV in the first reactor was 0.5, in the second reactor was 1, and in the third reactor was 1⅔. Diffusion units were disposed downstream of each reactor and were used to withdraw a portion of the product $H_2$.

The process was operated under a pressure of 150 p.s.i.g. The temperature control is shown in the table below. Reactor 1 was charged with 100 g. of 2 wt. percent Rh on alumina spheres containing about 6% silica. Reactor 2 was charged with 50 g. of 1.6 wt. percent Pt+0.4 wt. percent Rh on alumina spheres containing about 6% silica. Reactor 3 was charged with 30 g. of the latter catalyst. In each reactor, sufficient 8–14 mesh tabular alumina was dispersed with the catalyst to provide a catalyst zone of about 200 cc. The temperatures maintained in each reactor are given in the table. At the indicated hours, representative samples were connected and analyzed.

The table shows that the temperature at the inlet of Reactor 1, i.e., in the initial portion of the bed, was maintained between 520° and 550° C. In Reactors 2 and 3, the temperatures were higher generally than about 650° C. Further, the space velocity, or amount of catalyst used in each successive reactor bed was adjusted to the requirements of the reaction. Also, rhodium, which is a particularly effective catalyst for steam reforming of liquid hydrocarbons was used in Reactor 1.

The run operated successfully for over 200 hours without evidence of coking or catalyst deactivation.

What is claimed is:

1. A process for steam reforming normally liquid hydrocarbons which process comprises contacting a hydrocarbon feed boiling between 30° C. and about 400° C. in admixture with from about 1 to 2 mols of steam per atom of carbon in the feed with a platinum group metal catalyst in the presence of hydrogen added with said feed in an amount between about 0.05 and 10 mols of hydrogen per atom of carbon in the feed, effecting said contacting in an initial reaction zone maintained at a temperature below about 650° C. to convert at least 90% of the hydrocarbon into gaseous products including methane, hydrogen and oxides of carbon, and further contacting the reaction mixture with said catalyst at a temperature between about 700° C. and 1000° C., said contacting being effected at an elevated pressure between

TABLE 3

| | \multicolumn{10}{c}{Hrs. on Stream} |
|---|---|---|---|---|---|---|---|---|---|---|
| | 6/12 | 12/24 | 24/36 | 36/48 | 48/60 | 60/72 | 72/84 | 84/96 | 96/108 | 108/120 |
| | \multicolumn{10}{c}{Pressure (p.s.i.g.)} |
| | 150 | 151 | 150 | 150 | 150 | 150 | 150 | 150 | 150 | 151 |
| | \multicolumn{10}{c}{Temp., ° C.} |
| $R_1$: | | | | | | | | | | |
| Inlet | 547 | 530 | 552 | 548 | 529 | 528 | 524 | 528 | 522 | 538 |
| Middle | 652 | 634 | 636 | 632 | 627 | 630 | 623 | 632 | 632 | 632 |
| Outlet | 680 | 668 | 675 | 676 | 656 | 666 | 671 | 668 | 677 | 669 |
| $R_2$: | | | | | | | | | | |
| Inlet | 663 | 664 | 658 | 660 | 656 | 662 | 660 | 662 | 659 | 660 |
| Outlet | 694 | 678 | 696 | 697 | 693 | 684 | 694 | 684 | 690 | 655 |
| $R_3$: | | | | | | | | | | |
| Inlet | 660 | 664 | 672 | 677 | 688 | 679 | 680 | 668 | 672 | 656 |
| Outlet | 734 | 696 | 716 | 714 | 724 | 718 | 724 | 730 | 735 | 722 |
| Gas Make [1] | 12.5 | 11.5 | 10.5 | 10.4 | 12.1 | 10.4 | 10.2 | 10.6 | 11.4 | 11.4 |
| $H_2$ Make [1] | | 2.07 | 2.76 | 2.58 | 2.50 | 2.74 | 2.53 | 3.14 | 3.06 | |
| Off Gas Analysis: | | | | | | | | | | |
| $CO_2$ | 11.2 | | | 15.4 | | 14.9 | | 14.4 | | 16.7 |
| CO | 16.0 | | | 19.6 | | 19.1 | | 19.6 | | 18.2 |
| $H_2$ | 51.6 | | | 42.0 | | 42.9 | | 44.6 | | 46.2 |
| $CH_4$ | 21.2 | | | 23.0 | | 23.1 | | 21.4 | | 18.9 |

| | \multicolumn{10}{c}{Hrs. on Stream} |
|---|---|---|---|---|---|---|---|---|---|---|
| | 120/132 | 132/142 | 142/154 | 154/164 | 164/176 | 176/186 | 192/204 | 204/214 | 214/226 | 226/235 |
| | \multicolumn{10}{c}{Pressure (p.s.i.g.)} |
| | 151 | 150 | 151 | 151 | 151 | 151 | 151 | 151 | 147 | 151 |
| | \multicolumn{10}{c}{Temp., ° C.} |
| $R_1$: | | | | | | | | | | |
| Inlet | 540 | 546 | 542 | 537 | 545 | 543 | 544 | 543 | 546 | 527 |
| Middle | 628 | 631 | 633 | 625 | 632 | 634 | 635 | 637 | 637 | 617 |
| Outlet | 668 | 672 | 673 | 671 | 671 | 673 | 671 | 659 | 671 | 660 |
| $R_2$: | | | | | | | | | | |
| Inlet | 664 | 669 | 662 | 649 | 698 | 694 | 691 | 676 | 694 | 673 |
| Outlet | 710 | 707 | 716 | 677 | 738 | 730 | 713 | 703 | 750 | 734 |
| $R_3$: | | | | | | | | | | |
| Inlet | 674 | 667 | 688 | 662 | 680 | 672 | 724 | 690 | 740 | 699 |
| Outlet | 763 | 755 | 767 | 743 | 755 | 750 | 755 | 743 | 774 | 762 |
| Gas Make [1] | 11.9 | 11.7 | 11.0 | 11.0 | 10.6 | 10.6 | 11.8 | 11.4 | 10.2 | |
| $H_2$ Make [1] | 3.62 | 3.70 | 5.39 | 4.57 | 5.37 | 5.39 | 3.77 | 4.96 | 5.32 | |
| Off Gas Analysis: | | | | | | | | | | |
| $CO_2$ | | 15.7 | | 17.8 | | 18.7 | | 17.6 | | |
| CO | | 20.3 | | 22.6 | | 23.2 | | 23.8 | | |
| $H_2$ | | 47.0 | | 44.7 | | 43.8 | | 46.1 | | |
| $CH_4$ | | 17.0 | | 14.9 | | 14.3 | | 12.5 | | |

[1] Ft.$^3$(STP)/100 g. feed.

about 2 and about 50 atmospheres and a weight hourly space velocity between about 0.05 and about 5.

2. Process of claim 1 wherein the hydrogen is added in an amount between about 0.1 and 2.0 mols per atom of carbon in the feed.

3. Process of claim 1 wherein the catalyst is supported on an inert refractory oxide and the platinum group metal comprises .01 to 20 weight percent of the catalyst composition.

References Cited
UNITED STATES PATENTS

| | | | |
|---|---|---|---|
| 2,030,283 | 2/1936 | De Rewal | 23—212 |
| 2,907,647 | 10/1959 | Linden | 48—214 |
| 3,180,902 | 4/1965 | Andersen et al. | 48—213 X |
| 3,222,132 | 12/1965 | Dowden | 23—212 |
| 3,271,325 | 9/1966 | Davies et al. | 48—214 |
| 3,334,055 | 8/1967 | Dowden et al. | 48—214 X |

JOSEPH SCOVRONEK, Primary Examiner

U.S. Cl. X.R.

23—212; 48—197, 213